(12) United States Patent
Shafer

(10) Patent No.: US 9,880,189 B2
(45) Date of Patent: Jan. 30, 2018

(54) SPEED SENSOR INTERFACE INCLUDING DIFFERENTIAL COMPARATOR

(71) Applicant: Continental Automotive Systems, Inc., Auburn Hills, MI (US)

(72) Inventor: Daniel William Shafer, Mussey Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 526 days.

(21) Appl. No.: 14/493,604

(22) Filed: Sep. 23, 2014

(65) Prior Publication Data

US 2016/0084867 A1    Mar. 24, 2016

(51) Int. Cl.
*G01P 3/489* (2006.01)
*G01P 3/488* (2006.01)
*G01P 3/48* (2006.01)

(52) U.S. Cl.
CPC ............ *G01P 3/489* (2013.01); *G01P 3/4802* (2013.01); *G01P 3/488* (2013.01)

(58) Field of Classification Search
CPC .......... G01R 31/3167; G01R 31/31921; G01R 31/3191; G01R 31/31907; G01P 3/488; G01P 3/4802; G01P 3/489
USPC ..... 324/160–179, 76.11, 415, 424, 465, 601, 324/500, 207.13, 234–247, 529, 530
See application file for complete search history.

(56) References Cited

U.S. PATENT DOCUMENTS

| | | | |
|---|---|---|---|
| 4,940,907 A | 7/1990 | Laude | |
| 5,107,135 A | 4/1992 | Hagita | |
| 5,155,386 A | 10/1992 | Abdi | |
| 5,319,265 A | 6/1994 | Lim | |
| 5,451,867 A | 9/1995 | Loreck et al. | |
| 5,570,052 A | 10/1996 | Huijsing et al. | |
| 5,631,585 A | 5/1997 | Kinoshita et al. | |
| 6,133,728 A * | 10/2000 | Manlove | G01P 3/481 324/166 |
| 6,384,596 B1 | 5/2002 | Beyer | |
| 7,231,325 B2 | 6/2007 | Motz et al. | |
| 8,928,307 B2 | 1/2015 | Wang | |
| 8,981,756 B2 | 3/2015 | Vazach | |

(Continued)

FOREIGN PATENT DOCUMENTS

| | | |
|---|---|---|
| CN | 101241646 | 8/2008 |
| CN | 101241646 A | 8/2008 |

(Continued)

OTHER PUBLICATIONS

Office Action for DE counterpart application 10 2015 218 256.8, dated Nov. 4, 2016.

(Continued)

*Primary Examiner* — Melissa Koval
*Assistant Examiner* — Trung Nguyen

(57) ABSTRACT

A sensor interface circuit for a vehicle includes a signal conditioning module having at least one raw sensor signal input, and at least one conditioned sensor signal output, and a differential comparator module including a differential comparator and an adaptable hysteresis module. The adaptable hysteresis module provides a first hysteresis magnitude to the differential comparator when a sensor signal is below a threshold and a second hysteresis magnitude to the differential comparator when the sensor signal is above the threshold.

21 Claims, 3 Drawing Sheets

(56) References Cited

U.S. PATENT DOCUMENTS

| | | | |
|---|---|---|---|
| 2001/0033159 A1 | 10/2001 | Forrest et al. | |
| 2004/0233090 A1 | 11/2004 | Miyasita et al. | |
| 2012/0081103 A1* | 4/2012 | Wang ............... | G01R 19/16566 324/76.11 |

FOREIGN PATENT DOCUMENTS

| | | |
|---|---|---|
| CN | 102014017 A | 4/2011 |
| CN | 103428123 | 12/2013 |
| CN | 103428123 A | 12/2013 |
| CN | 103995241 | 8/2014 |
| CN | 103995241 A | 8/2014 |
| DE | 10 2004 029 941 B3 | 12/2005 |
| GB | 2 339 982 A | 2/2000 |

OTHER PUBLICATIONS

Variable Reluctance Sensor Interfaces with Differential Input and Adaptive Peak Threshold, Maxim MAX9924-MAX9927 data sheet, Maxim Integrated Products, Inc., Mar. 2012.
Chinese Office Action dated Jun. 20, 2017 for counterpart Chinese application No. 201510881835.7.
Korean Office Action and English translation dated Apr. 20, 2017 for counterpart KR patent application 10-2015-0133386.
China Office Action and English translation, dated Jun. 20, 2017, for counterpart CN patent application 201510881835.
China Search Report, dated Jun. 8, 2017 for counterpart CN patent application 201510881835.

\* cited by examiner

SPEED SENSOR INTERFACE INCLUDING DIFFERENTIAL COMPARATOR

TECHNICAL FIELD

The present disclosure relates generally to vehicle sensor arrangements, and more specifically to a speed sensor interface circuit including a differential comparator.

BACKGROUND

Vehicles, such as commercial and industrial vehicles, utilize speed sensors to detect the rotational speed of one or more components within an engine, or elsewhere on the vehicle during operation of the vehicle. The output of the speed sensor is, in some examples, provided to a differential comparator and the differential comparator provides a readable output to a microprocessor indicating when the speed has exceeded a pre-determined threshold. Based on the readable output, the microprocessor generates controls, thereby controlling the rotating component or any other system within the vehicle.

In existing interface circuits for connecting the output of a speed sensor to a microprocessor, the magnitude of the hysteresis used in the processing of the sensor signal is increased in correspondence with a speed increase. Variable reluctance speed sensors, and sensors that operate in a similar fashion to variable reluctance speed sensors, have an output signal with a magnitude that increases in correspondence with an increase in speed. As a result, at zero or low speeds, the output of a variable reluctance speed sensor can be difficult to distinguish from noise on the output signal line, and a greater hysteresis is required. In contrast, at high speeds, the magnitude of the output signal is significantly larger than the noise, and minimal hysteresis is required to interpret the signal.

SUMMARY OF THE INVENTION

Disclosed is a sensor interface circuit including a signal conditioning module including at least one raw sensor signal input, and at least one conditioned sensor signal output, and a differential comparator module including a differential comparator and an adaptable hysteresis module, wherein the adaptable hysteresis module provides a first hysteresis magnitude to the differential comparator when a sensor signal is below a threshold and a second hysteresis magnitude to the differential comparator when the sensor signal is above the threshold, and wherein the first hysteresis magnitude is greater than the second hysteresis magnitude.

Also disclosed is a method for operating a sensor interface circuit including receiving a sensor signal from a sensor, comparing the sensor signal to at least one threshold using a hysteresis comparator, wherein a magnitude of hysteresis applied by the hysteresis comparator is a first hysteresis magnitude when the sensor signal is below a threshold, and wherein the magnitude of hysteresis applied by the hysteresis comparator is a second hysteresis magnitude when the sensor signal is above the threshold, and outputting a high signal to a controller when the sensor signal exceeds the threshold.

Also disclosed is a vehicle including a speed sensor, a signal interface module operable to receive and condition an output of the speed sensor, a hysteresis comparator module operable to compare the sensor against a threshold and output high when the sensor signal exceeds the threshold and output low when the sensor signal does not exceed the threshold, and wherein the hysteresis comparator module has a first hysteresis magnitude when the output of the speed sensor does not exceed the threshold, a second hysteresis magnitude when the output of the speed sensor does exceed the threshold, and the first hysteresis magnitude is greater than the second hysteresis magnitude, and a controller operable to receive an output of the hysteresis comparator module.

These and other features of the present invention can be best understood from the following specification and drawings, the following of which is a brief description.

DETAILED DESCRIPTION OF AN EMBODIMENT

Figure 1:
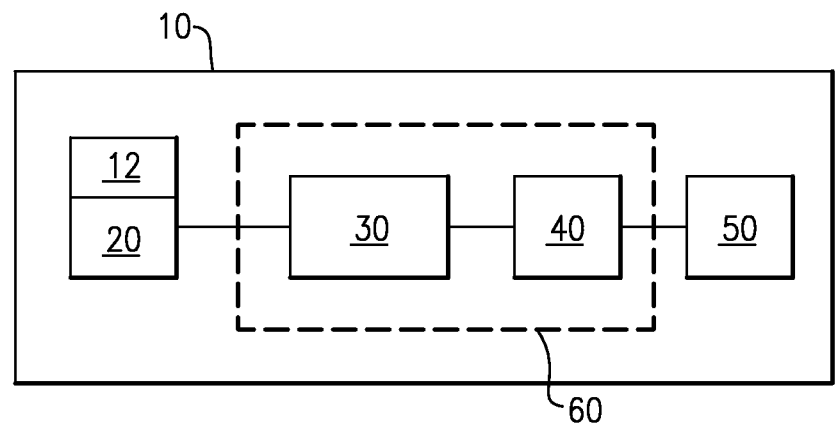
FIG. 1 schematically illustrates a vehicle including a speed sensor.

FIG. 1 schematically illustrates a vehicle 10. The vehicle 10 includes multiple rotating components 12 and a speed sensor 20 measuring the speed of at least one of the rotating components 12. In one example the speed sensor 20 is a variable reluctance speed sensor and the output magnitude of the speed sensor 20 increases as the speed of the rotating component 12 increases. A signal conditioning circuit 30 connects the output of the speed sensor 20 to an input of a differential comparator 40. The differential comparator 40 includes an open collector output that is provided to a controller 50. In some examples the controller 50 is a microprocessor. In other examples, the controller 50 is a general system controller including one or more microprocessors, as well as other control system components, and provides multiple vehicle systems controls. The signal conditioning circuit 50 and the differential comparator 40 are collectively referred to as an interface circuit 60.

Due to the correspondence between the magnitude of the sensor signal and the speed of the sensed component, at low or zero speed, the magnitude of the output of the sensor 20 is low relative to the magnitude of noise present on the output signal. This condition is referred to as a low signal to noise ratio. If the signal to noise ratio is too low, a significant application of hysteresis in the signal conditioning circuit 30 is required in order to prevent the noise from inadvertently tripping the differential comparator module 40 and to prevent unstable oscillations. Hysteresis is the utilization of previous states of a signal to filter the current signal. In other words, hysteresis is the application of a positive feedback loop to the input terminal of a comparator. A larger hysteresis results in a greater accuracy despite a low signal to noise ratio. The utilization of a large hysteresis, however, increases a delay in response times.

When paired with standard speed sensors, existing interface circuits increase the hysteresis as the speed of the rotating component 12 increases or maintain the hysteresis at the same level independent of the speed of the rotating component 12. Because of the low signal to noise ratio of variable reluctance sensors at low speeds, a large hysteresis is desired at zero and low speeds, while a low hysteresis is desirable at high speeds.

Figure 2:
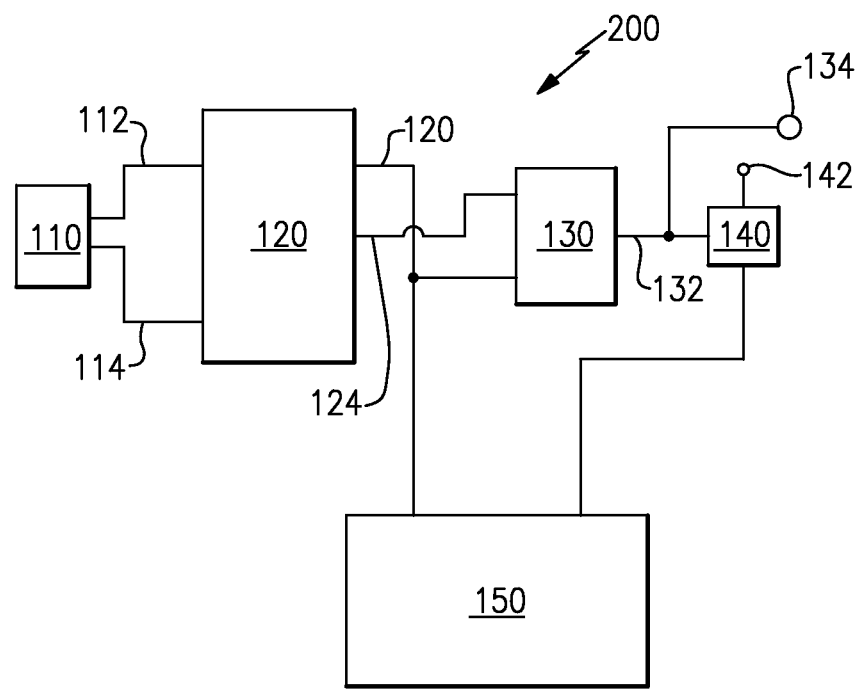
FIG. 2 schematically illustrates an interface circuit including a differential comparator.

FIG. 2 schematically illustrates a more detailed interface circuit 200 that encompasses the sensor 20, the signal conditioning circuit 30 and the differential comparator 40 of FIG. 1. A sensor 110, such as a variable reluctance sensor, includes a positive output 112 and a negative output 114. Each of the outputs 112, 114 is provided to a signal conditioning circuit 120. The signal conditioning circuit 120 processes the outputs 112, 114 from the sensor 110, and places the signal in a condition that is usable by a differential comparator module 130.

By way of example, the signal conditioning circuit 120 can provide terminal dampening reflections, a filter or a voltage drop for high voltage sensor signals, filter noise from the sensor signal, and clamp the inputs to a maximum voltage, thereby preventing damage to the overall circuit 200. In alternate examples, the signal conditioning circuit 120 can process and prepare the outputs 112, 114 in other ways as needed by the corresponding differential comparator module 130.

The signal conditioning module 120 provides two outputs, a positive output 122 and a negative output 124. The positive output 122 is provided to a negative terminal of a differential comparator module 130. Similarly, the negative output 124 is provided to a positive terminal of the comparator module 130. The comparator module 130 compares the outputs 122, 124 against two thresholds. The comparator module 130 output switches from low (zero volts) to high (positive voltage) when a high threshold is exceeded. The comparator 130 output switches from high to low when the sensed speed falls below a low threshold. In alternative examples, the low output of the comparator module 130 can be a non-zero voltage that is lower than the voltage of the high output. In one example, the differential comparator in the comparator module 130 is an open collector output differential comparator.

The output 132 of the differential comparator module 130 is provided to a switching module 140, and to a microprocessor output 134. The microprocessor output 134 provides the output of the differential comparator module 130 to a microprocessor in a controller 50, such as the controller 50 illustrated in FIG. 1, thereby allowing the controller 50 to utilize the sensed speed in control operations.

The switching module 140 receives the output 132 of the comparator module as a switch control signal. The switching module 140 includes an input 142 connected to a voltage supply (not illustrated). In the illustrated example, the output 132 provided to the switching module 140 causes the switching module 140 to switch on when the output of the differential comparator module 130 is high. In alternate examples, the switching module 140 can be replaced with a current mirror circuit, and operate in a functionally similar manner.

The adaptable hysteresis module 150 includes a hysteresis circuit that provides a first, higher, hysteresis level to the comparator module 130 when the sensed speed is below a speed threshold (when the comparator output is low). The adaptable hysteresis module 150 then switches to a lower hysteresis level when the sensed speed exceeds a predetermined threshold (when the comparator output is high). The predetermined threshold is set based on the physical qualities of components, such as resistors and capacitors, within the adaptable hysteresis module 150.

In operation, the on time of the switching module 140 controls whether the adaptable hysteresis module 150 is in a high hysteresis mode or a low hysteresis mode. As the on time of the switching module 140 is increased, the magnitude of voltage provided to the adaptable hysteresis module 150 through the switching module 140 in a given time period is increased. As a result, at least one capacitor, or similar charging component, within the adaptable hysteresis module 150 begins to charge at a faster rate than it discharges. Once the capacitor, or similar charging component, is fully charged, the adaptable hysteresis module 150 switches into the low hysteresis mode. As long as the capacitor, or similar charging component is charged, the adaptable hysteresis module 150 remains in the low hysteresis mode.

Figure 5:
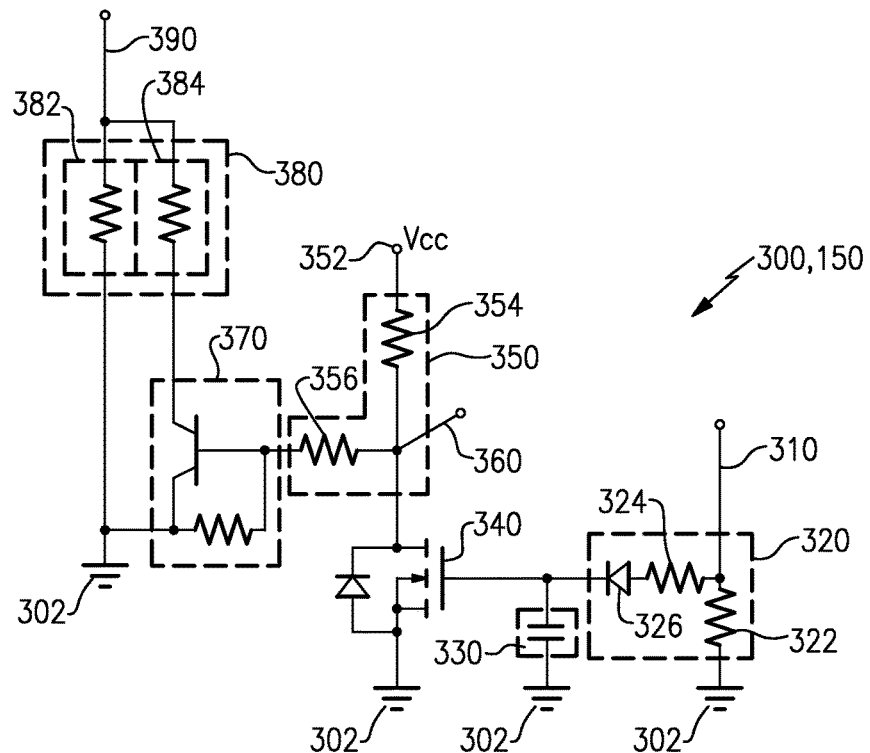
FIG. 5 illustrates an adaptable hysteresis module for the interface circuit.
Figure 6:
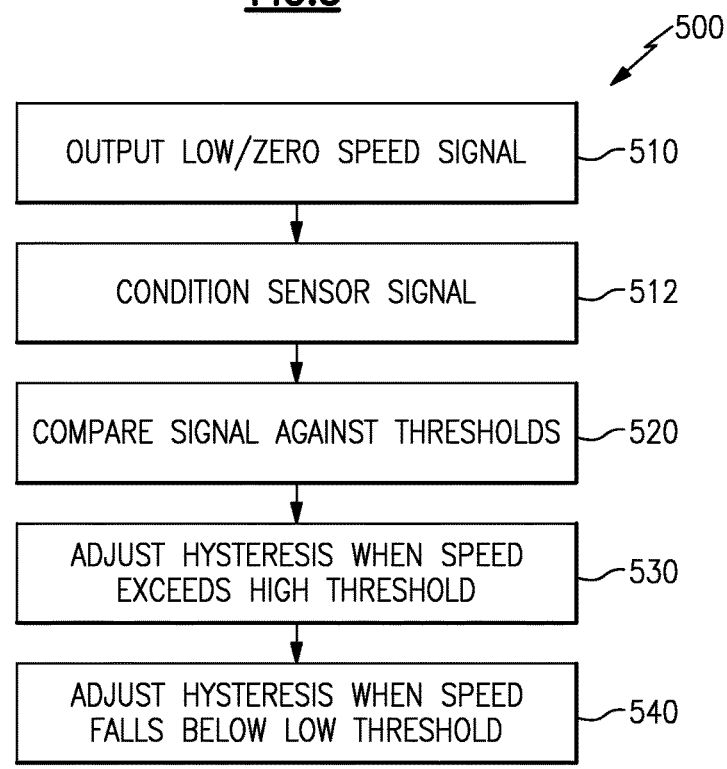
FIG. 6 is a flowchart illustrating a method for operating the interface circuit of FIGS. 2-5.

Once the speed of the sensed component falls below a threshold, the switching module 140 will no longer be on long enough in a given time period to charge the adaptable hysteresis module 150 faster than the adaptable hysteresis module 150 discharges, and the adaptable hysteresis module 150 reverts to the high hysteresis mode. A detailed example of the adaptable hysteresis module 150 is illustrated in FIG. 5 and is discussed below.

Figure 3:
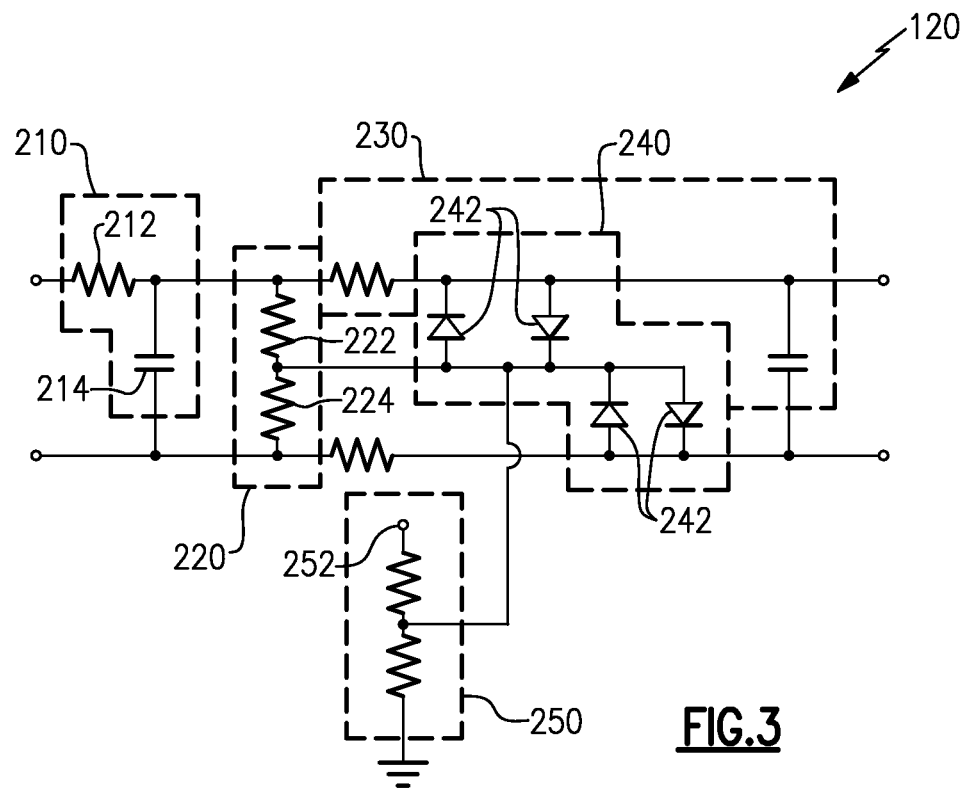
FIG. 3 schematically illustrates a sensor signal interfacing module for the interface circuit.
Figure 4:
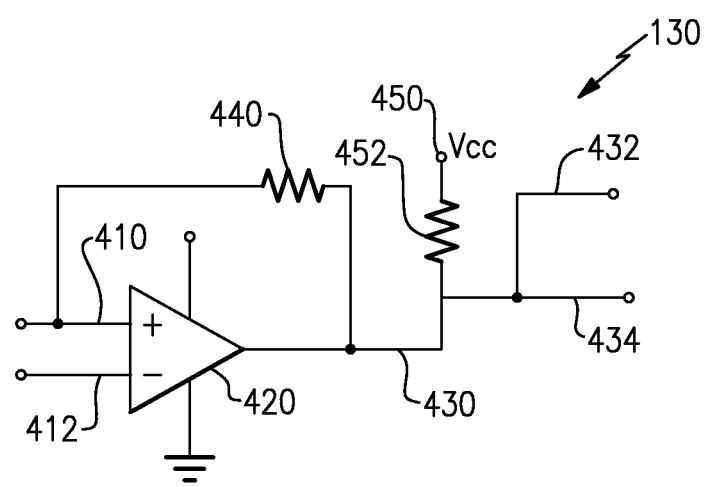
FIG. 4 schematically illustrates a differential comparator portion of the interface circuit.

With continued reference to FIG. 2, and with like numerals indicating like elements, FIG. 3 illustrates an example conditioning circuit 120 for interfacing the raw sensor outputs 112, 114 with a comparator module 130. The signal conditioning circuit 120 includes a first filter 210 having a resistor 212 and a capacitor 214. The first filter 210 provides an initial filtering of the raw sensor signal received from the speed sensor 110. The filtered signal is then provided to a terminal block 220 having a pair of resistors 222, 224. The terminal block 220 dampens sensor reflections on the sensor outputs 112, 114 and provides the dampened sensor signal to a second filter 230 and a voltage clamp 240.

The second filter 230 operates in a similar fashion to the first filter 210, and reduces noise on the sensor output. The voltage clamp 240 utilizes diodes 242 to clamp the sensor signal output at a maximum voltage, prior to outputting the sensor signals from the signal conditioning module 120. The signal conditioning circuit 120 further includes a bias voltage block 250, that provides a bias voltage from a voltage source (not pictured, connected to node 252). The bias voltage biases the differential comparator module 130 to a desired voltage.

In alternate examples, the signal interfacing module 120 can include additional signal processing elements, or less signal processing blocks as warranted by the specific application.

With continued reference to FIGS. 1-3, FIG. 4 schematically illustrates a differential comparator module 130. Once the raw signal from the sensor 110 has been processed by the signal conditioning module 120, the sensor signal is provided to a positive input terminal 410 of a differential comparator 420, and a reference signal is provided to a negative input terminal 412 of the differential comparator 420. The illustrated differential comparator 420 is a standard open ended differential comparator configured with an open collector output, and provides an output signal via a comparator output 430. A feedback resistor 420 connects the output of the differential comparator 420 to the positive input 410 of the differential comparator 420. As is understood by one of skill in the art having the benefit of this disclosure, the resistance of the feedback resistor 440 sets the zero crossings and the thresholds of the differential comparator 420, thereby determining when the differential comparator 420 outputs high and when the differential comparator 420 outputs low according to known differential comparator principles.

A bias voltage 450 is provided through a bias resistor 452 to the output signal 430, and the combined bias voltage 450 and output signal 330 is provided as an output 432, 434 from the differential comparator module 130. The two outputs 432, 434 are identical, and one of the outputs 432 is provided to a controller or microprocessor to facilitate controls, while the other output 434 is provided to the switching module 140.

As described above, the switching module 140 can be either a transistor bused switch module, such as a Field Effect Transistor (FET) circuit, or a current mirror circuit. In each of the examples, the switching module 140 on time depends on the input received from the differential comparator module 130. In other words, the percentage of time during which the switching module 140 is on, alternately referred to as closed, during a total period of time increases as the sensed speed (and thus, the output of the differential comparator) increases.

The switching module 140 connects the bias voltage source to the adaptable hysteresis module 150 when the switching module 140 is on. When the switching rate of the switching module 140 exceeds a threshold (e.g. when the sensed speed exceeds a speed threshold), the rate at which the adaptable hysteresis module 150 is charged is faster than the rate at which the adaptable hysteresis module 150 is discharged. Once this condition begins occurring, the adaptable hysteresis module 150 switches into a low hysteresis mode corresponding to a speed exceeding the speed threshold. The adaptable hysteresis module 150 provides a hysteresis to the comparator module 130, with the magnitude of the hysteresis depending on the on time of the switching module 140, as described above.

In alternate examples, the adaptable hysteresis module 150 can be functionally replaced by a digital logic circuitry, which applies hysteresis to the signal using a pre-established logic circuit within a microprocessor. In the alternate examples, the output 334 is provided directly to the hysteresis microprocessor or logic circuit, the hysteresis microprocessor or logic circuit determines the correct hysteresis to apply, and applies the hysteresis. The microprocessor or logic circuit then provides an output to the negative input 312 of the differential comparator 320, as in the solid state example adaptable hysteresis module 150. One of skill in the art, having the benefit of this disclosure will be able to generate the necessary digital logic sequence to perform the above described function using known digital logic protocols.

With continued reference to FIG. 2, FIG. 5 illustrates an example solid state circuit 300 for the adaptable hysteresis module 150. The solid state circuit 300 includes an input 310 that is connected to the output of the switching module 140 of FIG. 2. The input 310 receives a positive voltage from the switching module 140 when the switching module 140 is turned on, and no voltage when the switching module 140 is turned off.

The charge from the switching module 140 is passed through a conditioning element 320, including resistors 322, 324 and a diode 326. The conditioning element 320 is connected to a neutral 302, alternatively referred to as a ground. Also connected to the conditioning element 320 is a charge element 330. In the illustrated example the charge element 330 is a capacitor 302. One of skill in the art will recognize that alternative charge elements functioning in a similar capacity will provide functionally similar operations and can be substituted for the illustrated capacitor with minimal alterations.

Connected to the high side of the charge element 330 is a gate of a field effect transistor 340. As a result of this connection, the charge element 330 controls the open/closed state of the FET 340. While the charge element 330 is charging (e.g. not at full charge), the FET 340 is maintained in an open state. Once the charge element 330 has become fully charged, however, voltage provided from the input 310 is provided to the gate of the FET 340, and the FET 340 is closed.

Also included in the adaptable hysteresis module, 150 is a pull up circuit 350 connected to a bias voltage at a bias voltage input 352. The pull up circuit 350 includes two resistors 354, 356, and is connected to a gate of a hysteresis control transistor 370. The pull up circuit 350 ensures that the gate of the hysteresis control transistor 370 remains high, thereby turning the hysteresis control transistor 370 on, as long as the FET 340 is open. Once the FET 340 becomes closed, a direct path to neutral 302 is provided for the bias voltage, and the gate of the hysteresis control transistor 370 is pulled down. When the FET 340 re-opens, the gate of the hysteresis control transistor 370 is brought back up by the pull up circuit 350 and the hysteresis control transistor 370 is turned on.

The hysteresis control transistor 370 controls the resistance in a hysteresis resistor network 380 by switching a resistor 384 into and out of the hysteresis resistor network 380. When the hysteresis control transistor 370 is on (closed), the second resistor 384 in the hysteresis resistor network 380 is switched in, parallel to a first resistor 382 and provides an alternative path to neutral 302. The inclusion of the parallel resistor 384 in turn decreases the overall resistance of the hysteresis resistor network 380, thereby decreasing the amount of hysteresis applied to the signal being received by the differential comparator module 130.

While each branch of the hysteresis resistor network 380 is symbolically illustrated as identical resistors 382, 284, one of skill in the art, having the benefit of this disclosure will understand that multiple different resistors can be included in each branch as needed, and thereby control the magnitude of the applied hysteresis in each condition.

Also included within the adaptable hysteresis control module 300 is an output 360. The output 360 provides a binary output to a controller indicating what mode the adaptable hysteresis module 300 is in at a given time.

Furthermore, while the above system is described with two modes, high hysteresis and low hysteresis, one of skill in the art, having the benefit of this disclosure will understand that additional iterations of the adaptive hysteresis module can be utilized in a single system to provide additional levels of hysteresis control with minimal adaption to the circuits and systems described herein.

With continued reference to FIG. 1-5, FIG. 6 is a flowchart illustrating a method 500 for operating the above described speed sensor interface circuit. When the vehicle is first started, the speed sensor outputs a low/zero speed signal in an "Output Low/Zero Speed Signal" step 510. The interface circuit processes the sensor output in a processes sensor signal using the signal conditioning module in a "Condition Sensor Signal" step 512.

The conditioned sensor signal is provided to a hysteresis comparator that applies hysteresis to the signal and compares the signal against a reference voltage in a "Compare Signal Against Thresholds" step 520. At the startup, or when the previous speed outputs were low the hysteresis applied during the comparison are a higher level of hysteresis and enable a microprocessor to distinguish the sensor signal from a noise level.

When the detected speed of the speed sensor exceeds the high threshold of the hysteresis comparator, the hysteresis of the system is adjusted to a lower hysteresis value, and the comparator is switched to outputting a high value in an "Adjust Hysteresis When Speed Exceeds High Threshold" step 530. Once the hysteresis has been set to a lower value, the hysteresis is maintained until the output of the speed sensor falls below the low threshold of the hysteresis comparator. When the speed sensor output falls below the low threshold, the hysteresis is adjusted again to return to the high hysteresis value corresponding to low/zero speed output of the speed sensor in an "Adjust Hysteresis When Speed Falls Below Low Threshold" step 540. The hysteresis adjustments of steps 530 and 540 are continued throughout the course of vehicle operation, thereby ensuring that a low hysteresis is applied when the speed sensor detects a high speed and a high hysteresis is applied when the speed sensor detects a low or zero speed.

One of skill in the art, having the benefit of the above disclosure will be able to modify the system and method described above to incorporate additional hysteresis levels beyond a binary high/low using a similar circuit with only minor modifications to the above described circuit.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A sensor interface circuit comprising:
a signal conditioning module including at least one raw sensor signal input, and at least one conditioned sensor signal output; and
a differential comparator module including a differential comparator;
an adaptable hysteresis module, wherein said adaptable hysteresis module provides a first hysteresis magnitude to said differential comparator when a sensor signal is below a threshold and a second hysteresis magnitude to said differential comparator when said sensor signal is above said threshold, and wherein said first hysteresis magnitude is greater than said second hysteresis magnitude; and
a switching module connecting an output of said differential comparator module to said adaptable hysteresis module, and wherein said switching module conducts a current to said adaptable hysteresis module when said sensor signal is above said threshold, and blocks conduction of the current to said adaptable hysteresis module when said sensor signal is below said threshold.

2. The sensor interface circuit of claim 1, wherein said signal conditioned module includes at least one of a terminal dampening reflector, a noise filter, and a voltage clamp.

3. The sensor interface circuit of claim 1, wherein said switching module comprises at least one transistor having a control terminal coupled to said output of said differential comparator module and a conduction terminal coupled to said adaptable hysteresis module.

4. The sensor interface of claim 3, wherein the at least one transistor includes a second conduction terminal for coupling to a voltage supply, the current conducted to the said adaptable hysteresis module being supplied by the voltage supply.

5. The sensor interface of claim 1, wherein said switching module comprises a current mirror.

6. The sensor interface of claim 1, wherein said adaptable hysteresis module further comprises a charging component operable to be charged while said switching module conducts said current and discharged while said switching module blocks conduction of said current.

7. The sensor interface of claim 6, wherein the charging component comprises a capacitor.

8. The sensor interface of claim 6, wherein said adaptable hysteresis module comprises:
a first hysteresis branch, said first hysteresis branch being always connected to said differential comparator so as to provide a first resistance thereto;
a hysteresis control switch; and
a second hysteresis branch connected to said hysteresis control switch such that said second hysteresis branch is connected to and provides a second resistance to said differential comparator when said hysteresis control switch is turned on and wherein said second hysteresis branch does not provide the second resistance to said differential comparator when said hysteresis control switch is turned off;
wherein a total hysteresis provided to said differential comparator from said adaptable hysteresis module is greater when said hysteresis control switch is turned on than when said hysteresis control switch is turned off.

9. The sensor interface of claim 8, wherein said hysteresis control switch is turned off when said charging component is fully charged, and wherein said hysteresis control switch is turned on when said charging component is not fully charged.

10. The sensor interface of claim 9, further comprising a pull up circuit connected to a control terminal of said hysteresis control switch so as to turn on said hysteresis control switch when said charging component is not fully charged.

11. The sensor interface of claim 10, wherein the at least one raw sensor signal input is a variable reluctance speed sensor input.

12. The sensor interface circuit of claim 1, wherein said adaptable hysteresis module comprises a hysteresis control switch and a resistor network comprising a first resistor branch and a second resistor branch, the hysteresis control switch being connected to second resistor branch for controlling current passing therethrough, said resistor network providing a resistance to said differential comparator, said hysteresis control switch being controlled such that a total resistance of said resistor network provided to said differential comparator is based upon whether said hysteresis control switch is turned on or turned off, and said first and second hysteresis magnitudes being based upon said total resistance of said resistor network.

13. The sensor interface circuit of claim 12, wherein said adaptable hysteresis module comprises a charging component coupled to said switching module so as to be charged thereby when said switching module conducts said current, said charging component being coupled to said hysteresis control switch such that said hysteresis control switch is turned on and turned off based upon a charge of said charging component.

14. A method for operating a sensor interface circuit comprising:
receiving a sensor signal from a sensor;

comparing the sensor signal to at least one threshold using a hysteresis comparator, wherein a magnitude of hysteresis applied by said hysteresis comparator is a first hysteresis magnitude when said sensor signal is below a threshold, and wherein the magnitude of hysteresis applied by said hysteresis comparator is a second hysteresis magnitude when said sensor signal is above the threshold;

outputting a high signal to a controller when said sensor signal exceeds said threshold; and altering said magnitude of said hysteresis applied when said sensor signal exceeds the threshold, comprising charging a charging component in or associated with said hysteresis comparator when said sensor signal exceeds said threshold and discharging the charging component when said sensor signal does not exceed said threshold.

15. The method of claim 14, further comprising processing said sensor signal using a signal conditioning circuit prior to comparing the sensor signal to at least one threshold using a hysteresis comparator.

16. The method of claim 14, wherein altering said magnitude of said hysteresis applied when said sensor signal exceeds the threshold comprises disconnecting a hysteresis branch from an input of said hysteresis comparator when said charging component is charged.

17. The method of claim 14, wherein receiving a sensor signal from a sensor comprises receiving a signal from a variable reluctance speed sensor.

18. An apparatus for a vehicle comprising:
a speed sensor;
a signal interface module operable to receive and condition an output of said speed sensor;
a hysteresis comparator module operable to compare said output of said signal interface module against a threshold and output a first logic value when said output of said signal interface module exceeds said threshold and output a second logic value when said output of said signal interface module does not exceed said threshold, and wherein said hysteresis comparator module has a first hysteresis magnitude when said output of said signal interface module does not exceed said threshold, a second hysteresis magnitude when said output of said signal interface module does exceed said threshold, and said first hysteresis magnitude is greater than said second hysteresis magnitude; and a controller operable to receive an output of said hysteresis comparator module, wherein said hysteresis comparator module further comprises a differential comparator, an adaptable hysteresis module and a switching module connecting an output of the differential comparator to an input of said adaptable hysteresis module, and wherein said switching module conducts and provides a current to said input of said adaptable hysteresis module when said sensor signal is above said threshold, and blocks conduction and the current to said input of said adaptable hysteresis module when said sensor signal is below said threshold.

19. The apparatus of claim 18, wherein said speed sensor is a variable reluctance speed sensor.

20. The apparatus of claim 18, wherein said adaptable hysteresis module comprises a hysteresis control switch and a resistor network comprising a first resistor branch and a second resistor branch, the hysteresis control switch being connected to the second resistor branch for controlling current passing therethrough, said resistor network providing a resistance to said differential comparator, said hysteresis control switch being controlled such that a total resistance of said resistor network provided to said differential comparator is based upon whether said hysteresis control switch is turned on or turned off, and said first and second hysteresis magnitudes being based upon said total resistance of said resistor network.

21. The apparatus of claim 20, wherein said adaptable hysteresis module comprises a charging component coupled to said switching module so as to be charged thereby when said switching module provides said current, said charging component being coupled to said hysteresis control switch such that said hysteresis control switch is turned on and turned off based upon a charge of said charging component.

* * * * *